Aug. 28, 1923.          1,466,635
C. H. TOWER
SYSTEM AND APPARATUS FOR GENERATING AND DISTRIBUTING ELECTRIC CURRENTS
Filed Dec. 12, 1918        5 Sheets-Sheet 2
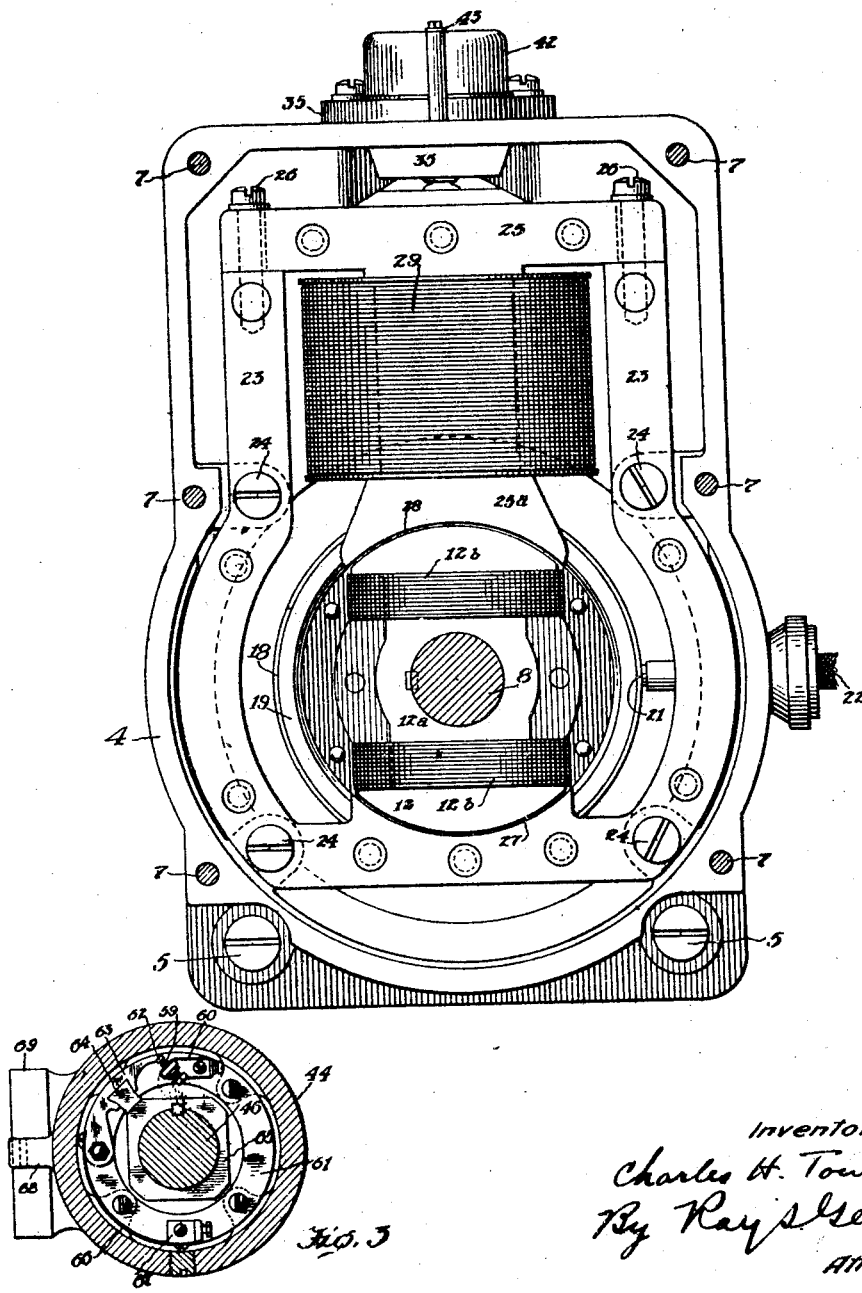
Inventor
Charles H. Tower
By Ray S. Sehr
Attorney

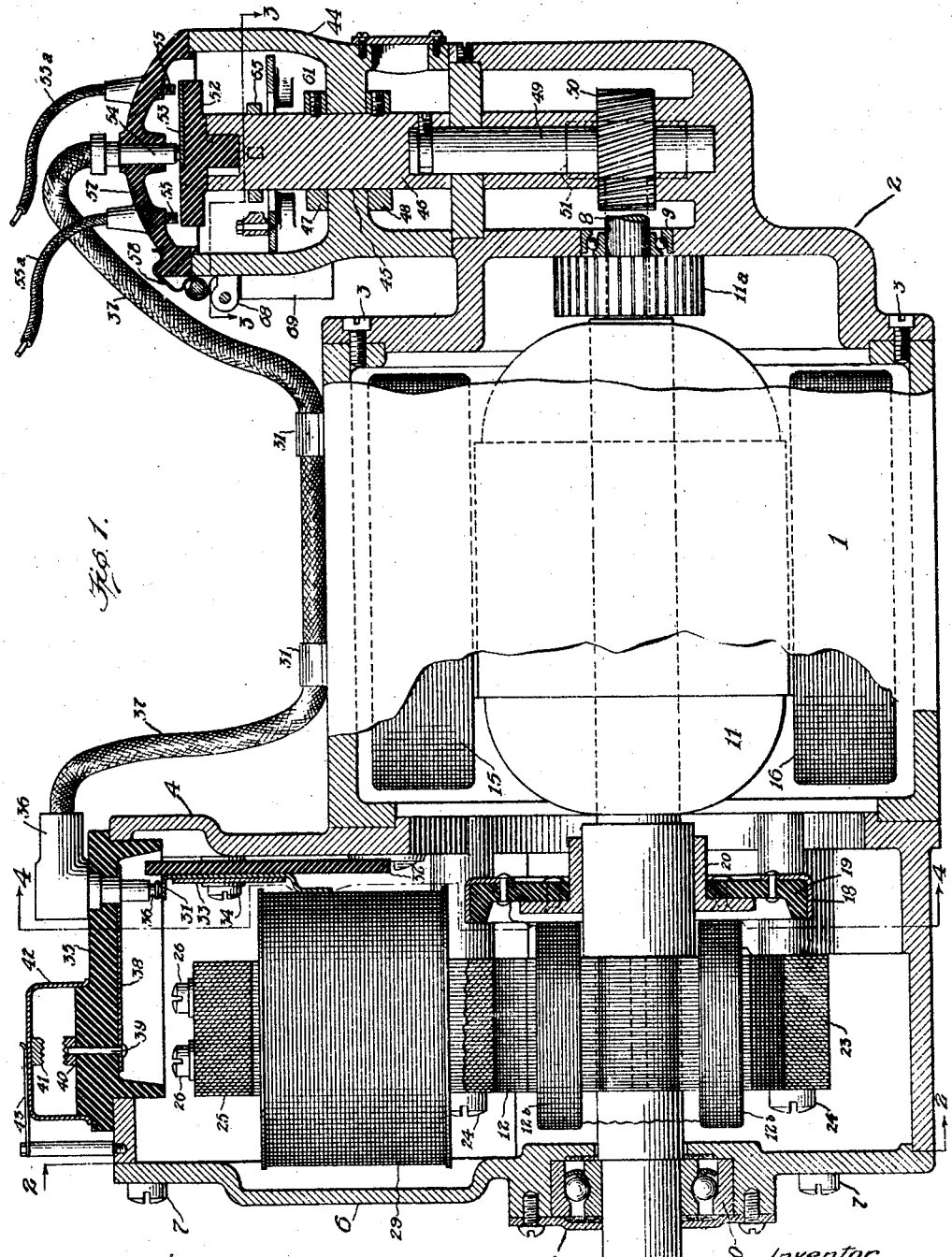

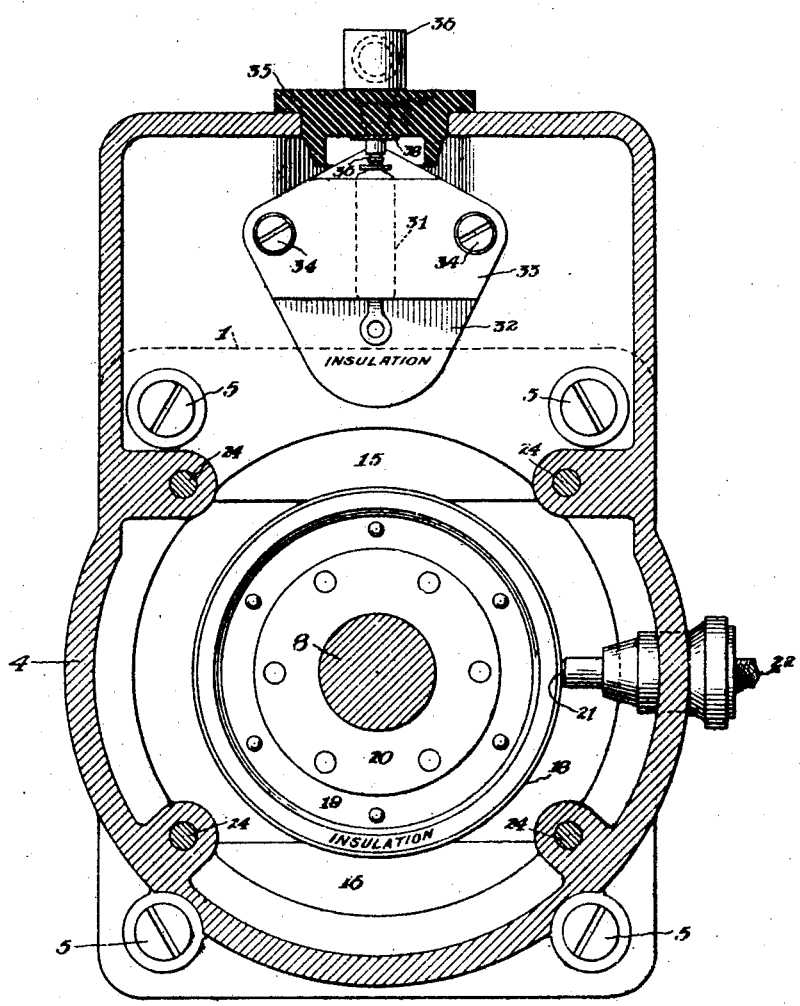

Aug. 28, 1923.  1,466,635
C. H. TOWER
SYSTEM AND APPARATUS FOR GENERATING AND DISTRIBUTING ELECTRIC CURRENTS
Filed Dec. 12, 1918  5 Sheets-Sheet 4
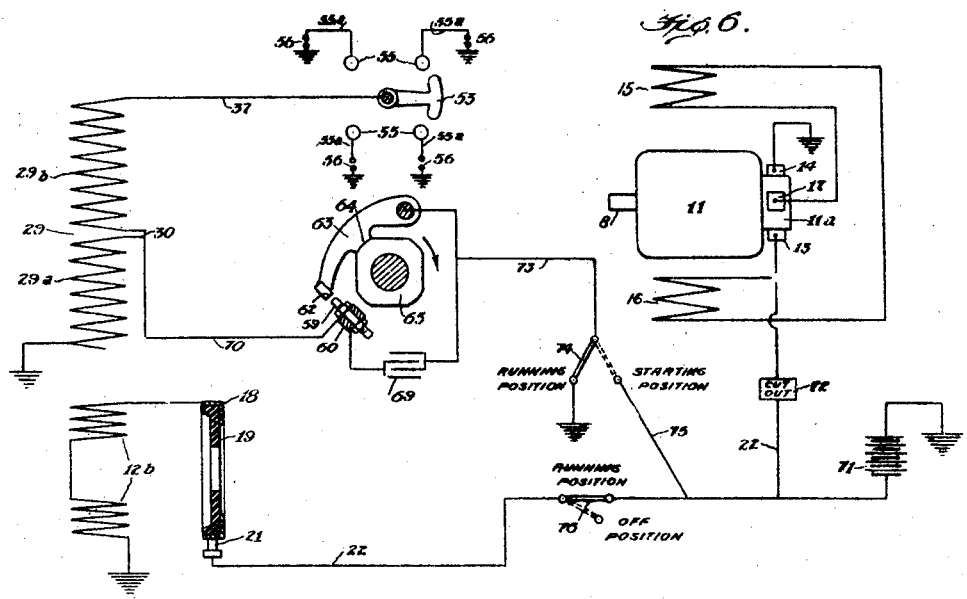
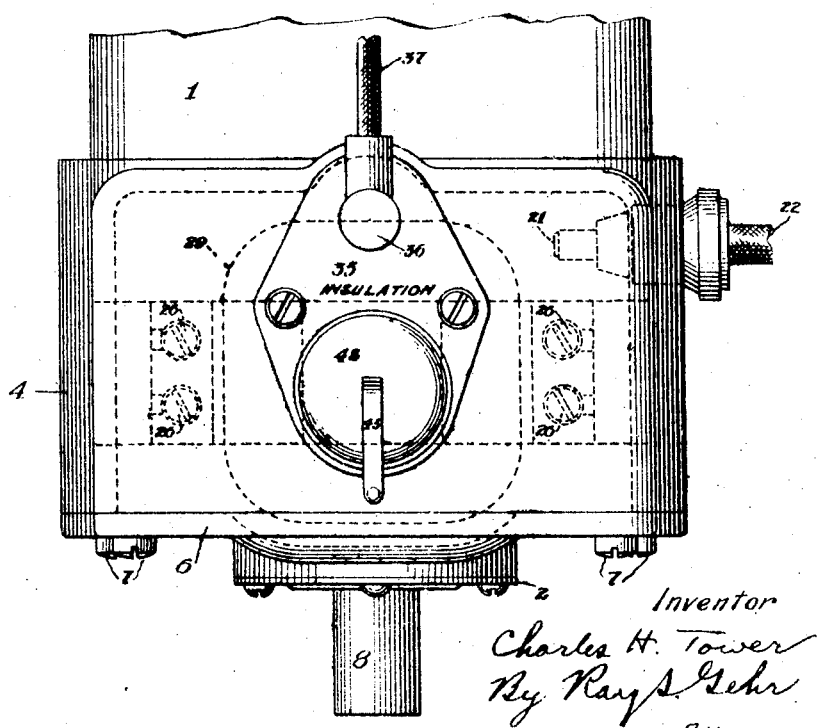
Inventor
Charles H. Tower
By Ray S. Gehr
Attorney Aug. 28, 1923.
C. H. TOWER
1,466,635
SYSTEM AND APPARATUS FOR GENERATING AND DISTRIBUTING ELECTRIC CURRENTS
Filed Dec. 12, 1918    5 Sheets-Sheet 5
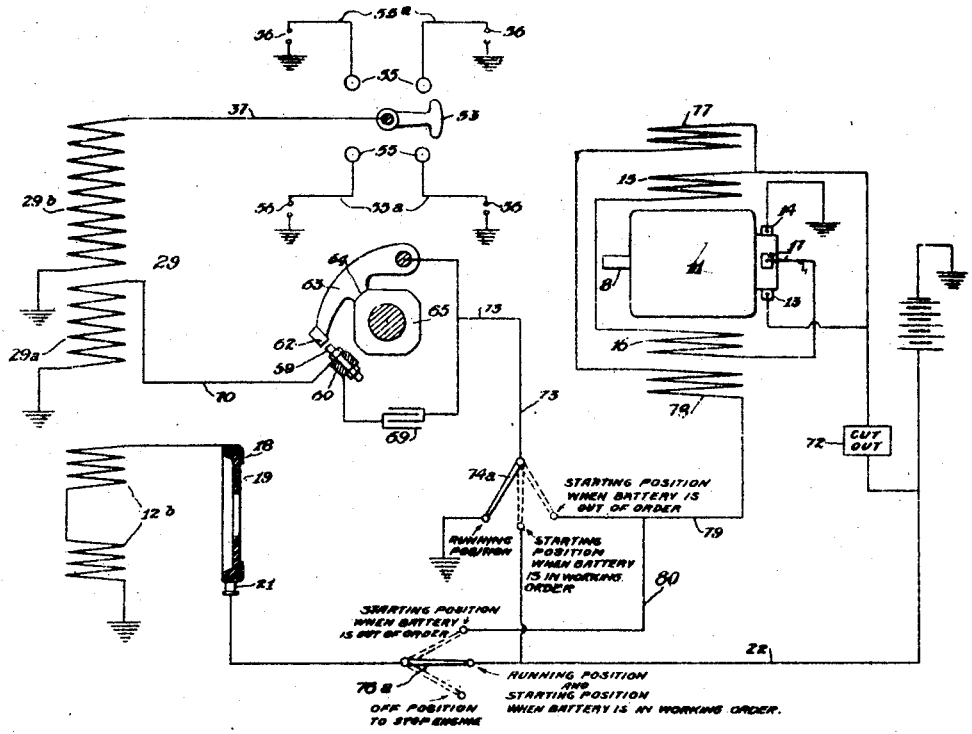
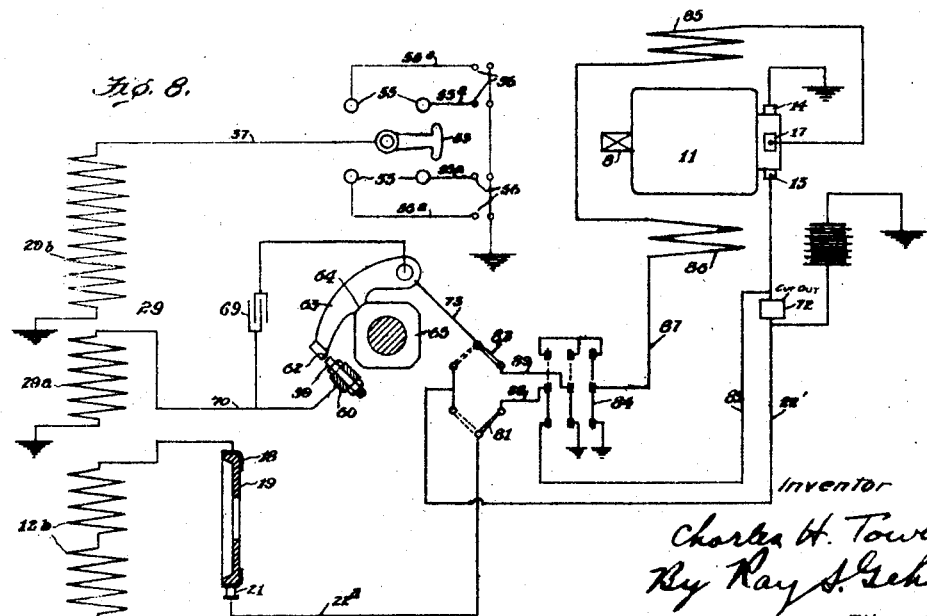
Inventor
Charles H. Tower
By Ray S. Gehr
Attorney Patented Aug. 28, 1923.

1,466,635

UNITED STATES PATENT OFFICE.

CHARLES H. TOWER, OF CLEVELAND, OHIO, ASSIGNOR TO THE TEAGLE COMPANY, OF CLEVELAND, OHIO, A CORPORATION OF OHIO.

SYSTEM AND APPARATUS FOR GENERATING AND DISTRIBUTING ELECTRIC CURRENTS.

Application filed December 12, 1918. Serial No. 266,437.

*To all whom it may concern:*

Be it known that I, CHARLES H. TOWER, a citizen of the United States, residing at Cleveland, in the county of Cuyahoga and State of Ohio, have invented certain new and useful Improvements in Systems and Apparatus for Generating and Distributing Electric Currents, of which the following is a specification, reference being had therein to the accompanying drawings.

This invention relates to a system for generating and distributing electric currents and has to do more especially with an apparatus adapted to generate low tension current for battery charging purposes and high tension current for ignition purposes for use in connection with internal combustion engines and especially engines used for automotive purposes.

In United States Patent 1,276,085, Le Pontois has shown an electrically excited combined unit high tension ignition and low tension battery charging generator designed to combine the advantages of the magneto ignition and the battery ignition systems. The present invention has for its general object the provision of an improved generator of this type.

Speaking more particularly, the present invention has for one of its principal objects the maintenance of the maximum flux value through the generating winding of the ignition generator substantially constant, irrespective of variations of the field excitation of the ignition current generator due to any cause, such for example as variation of voltage of the source of a field exciting current.

Another object of my present invention is the production of a combined low tension and high tension generator having the advantages of the earlier generators of the combined unit type and being, in addition, adapted to operate efficiently through a larger angular sparking range than were the said earlier generators.

A further object of the present invention is the provision in a system of the character in question of improved means or instrumentalities for insuring strong ignition currents at low engine speeds.

Other objects of the invention, more or less incidental to the foregoing, will appear in the following description in connection with the accompanying drawings in which I show several preferred embodiments of my invention.

In the drawings,

Figure 1 is a side elevation, partly in longitudinal section, of a combined unit generator in accordance with my invention.

Figure 2 is a vertical section on the line 2—2, Figure 1.

Figure 3 is a horizontal section on the line 3—3, Figure 2.

Figure 4 is a section on the line 4—4, Figure 1.

Figure 5 is a top plan view of the high tension part of the generator, the low tension generator parts being broken away.

Figure 6 is a wiring diagram of one form of my improved system.

Figure 7 is a wiring diagram of an alternative form of construction especially adapted to insure satisfactory ignition at low engine speeds when the battery is for any reason out of commission.

Figure 8 is a wiring diagram showing another alternative construction for insuring satisfactory ignition at low engine speeds when the battery is out of commission.

Referring to the construction shown in Figures 1 to 6, inclusive, 1 is the main part of the field frame or casing of the low tension generator, 2 is an end plate casting detachably secured by screws 3 to one end of the frame part 1, 4 is a casing, preferably non-magnetic, for the high tension generator parts detachably secured by screws 5 to the other end of the field frame 1, and 6 is a non-magnetic end plate detachably secured by screws 7 to the outer side or end of the casing 4.

The combined unit generator has a unitary rotor structure comprising a shaft 8 mounted in anti-friction bearings 9, 10 in the end plates 2 and 6 respectively, a direct current armature 11 with commutator $11^a$, of standard construction, and a rotary field element 12 of the high tension circuit. This rotor 12 comprises a laminated iron body $12^a$ keyed to the shaft 8 and an exciting winding consisting of two coils $12^b$ formed with a sufficient number of turns of sufficiently fine wire to insure at the same time both ample excitation and a small draft of current, these being characteristics of the prior, patented, combined unit generators above referred to.

The usual brushes 13, 14 co-operate with the commutator 11ª, the brush 14 being grounded as indicated in Figure 6. The low tension generator is excited by a winding comprising coils 15, 16 which are mounted on diametrically opposite field poles in the usual manner, one terminal of the winding being connected to the brush 13 while the other terminal of the winding is connected to a third brush 17 which is designed to afford the so called third brush regulation for the low tension generator.

The exciting coils 12ᵇ may be suitably connected in series or parallel, according to the size and length of the winding. As shown they are connected in series, one end of the winding being grounded as indicated in Figure 6 and the other end being connected to a collector ring 18 which is mounted on a disc 19 of insulating material, said disc in turn being carried by a hub 20 which is fast on the shaft 8. A brush 21, carried by the casing 4, contacts with the collector ring 18 and is connected through a lead 22 with the commutator brush 13 of the low tension generator.

The stationary part of the field structure of the high tension generator comprises a U-shaped laminated iron frame 23 secured by screws 24 to the non-magnetic casing 4 and a laminated iron yoke 25 which bridges the upper end of the U-shaped frame 23 to which it is secured by screws 26. The U frame 23 is formed at its lower side with a polar face 27 adapted to co-operate with the polar faces of the rotor 12, and the yoke 25 is formed with a depending polar extension 25ª having a polar face 28 diametrically opposite the polar face 27. On the polar extension 25ª is mounted a high tension generating winding 29 comprising a coarse section 29ª and a fine section 29ᵇ.

One end of the coarse winding 29ª is grounded, as indicated in Figure 6, while its other end is connected at 30 to one end of the fine winding 29ᵇ. To the other end of the said fine winding is connected a contact plate 31 which is clamped upon the insulating plate 32 by plate 33 and screws 34.

An insulating block 35 is mounted in an opening in the top of the casing 4 and carries the terminal 36 of a high tension lead 37, said terminal being held in contact with the plate 31. The block 35 carries a conductor strip 38 which connects the terminal 36 with a rod 39 which extends upward to the lower electrode 40 of a safety air gap, the upper electrode 41 of which is carried by an inclosing cap 42 secured in place by spring arm 43.

On the end plate casting 2 of the generator is mounted a combined distributor and breaker mechanism. It is a common practice in ignition generators to mount the breaker actuating cam on the main shaft of the generator and the distributor arm on a secondary shaft, and I may employ such a construction. I prefer, however, especially in the case of four or six cylinder engines, to actuate both the distributor and breaker by a secondary shaft, as in the mechanism illustrated. Said mechanism comprises a housing 44 which is formed with a bearing 45 in which is rotatably mounted a shaft 46, said shaft being secured against endwise movement by thrust collars 47 and 48. To the lower end of the shaft 46 is connected a shaft 49 on which is mounted a skew gear 50 that meshes with and is driven by a similar gear 51 on the end of the rotor shaft 8, the speed ratio of the shafts 8 and 49 being 2 to 1 for a four cylinder engine, 3 to 1 for a six cylinder engine, and so on.

On the upper end of the shaft 46 is mounted an insulation block 52 which carries a radial distributor arm 53. The inner end of arm 53 is engaged by a terminal 54 of the high tension lead 37 while its outer end is arranged to move successively through points adjacent to the several terminals 55, 55 of high tension leads 55ª, 55ª that extend to the spark plugs 56 of the engine cylinders. The terminals 54 and 55, 55 are mounted in a cap 57 of suitable insulating material which is secured in position by one or more spring clips 58.

The breaker mechanism comprises a fixed electrode 59 which is adjustably mounted on a holder 60 which is mounted on and suitably insulated from a ring 61 that is supported by but insulated from the casing 44. A movable electrode 62 is carried by an arm 63 which is pivotally mounted on the ring 61. The arm 63 carries a fibre shoe 64 which is arranged to operatively engage an actuating cam 65 keyed to the shaft 46. The arm 63 is yieldingly pressed into engagement with the cam by a spring 66 which is connected at one end to said arm and at its other end to a terminal block 67 on the ring 61. The housing 44 is angularly adjustable about the axis of the shaft 46 to provide for the advancing and retarding of the spark, and is provided with an arm 68 by which, through suitable connections said angular adjustment can be effected.

69 is a condenser mounted on the casing 44 and, as indicated in Figure 6, electrically connected in the usual manner across the electrodes of the breaker. The fixed electrode of the breaker is connected by a lead 70 with the junction point 30 of the coarse and fine sections 29ª and 29ᵇ of the high tension winding.

71 is a storage battery, one terminal of which is grounded while its other terminal is connected, through lead 22, with the low tension generator brush 13 and with the collector ring 18 through which current is supplied to the exciting winding 12$^b$ of the high tension generator. A cut-out mechanism 72, which is designed to automatically open the circuit when the voltage of the low tension generator falls below a certain value and to close the circuit when the voltage rises above this value, is interposed between said generator and the battery 71.

The movable electrode 62 of the breaker is connected by lead 73 with a switch 74 by means of which the said electrode is normally connected to ground but can be connected through lead 75 with the storage battery 71 and, when the cut-out 72 is closed, with the terminal of the low tension generator.

A switch 76 is provided to break the circuit through the lead 22, for the purpose of stopping the engine.

In a combined unit generator of the character here in question, with both the high tension magnetic circuit and the low tension magnetic circuit excited from a common current source, an important consideration is the fact that the demands upon the high tension generator are radically different from the demands upon the low tension generator. To meet this condition and in particular to minimize the effects on the ingnition generator of varying field excitation due to varying low tension generator speeds and loads with consequent field current variations, or to battery voltage variations, or to other causes, the maximum value of flux linking through the generating winding is maintained substantially constant by so proportioning and correlating the parts constituting the magnetic circuit of the ignition generator that when the flux shifting or distributing member is in position for maximum flux linkage through the generating coil, the magnetic circuit shall be highly saturated even with low magneto-motive force in the exciting circuit. To accomplish this I prefer to make the air gaps in the magnetic circuit of the high tension generating winding small, to make the air gap reluctance of said circuit small in relation to the reluctance of the iron parts of said circuit, and to shape and proportion the iron parts of said circuit to reach saturation approximately simultaneously.

The operation of the above described system is as follows: On starting the engine, the spark first having been retarded by adjustment of casing 44 and the cut-out 72 being open by reason of the low speed of rotation, current flows from the storage battery 71 through the lead 22, brush 21 and collector ring 18 to the exciting winding 12$^b$ of the high tension rotor. When the rotor is in the position shown in Figure 2, flux passes up through the generating winding 29, divides and passes in opposite directions through the yoke 25 and downward through the two branches of the frame 23, and thence upward again through the rotor. As the rotor revolves the flux is gradually cut out of the generating winding 29, and the rotor is magnetically short circuited when it has turned 90 degrees so that the flux in the high tension generating winding has been reduced substantially to zero. Upon further rotation of the rotor the flux is again passed into the high tension generating winding 29 but in the opposite direction and increases until the rotor has moved 180 degrees from its original position. The flux is now at its maximum value again but passes through the generating winding in a reverse direction from what it did in the initial position of the rotor, so that, algebraically speaking, there is a continuous decrease of the flux throughout the rotor movement of 180 degrees. While the flux is decreasing the breaker closes and current flows in the short circuited coarse section 29$^a$ of the generating winding. With the continued movement of the rotor the flux through the generating winding continues to decrease and at a suitable point the cam 65 causes the breaker to open, whereupon, the current in this section of the coil being interrupted, a rapid collapse of the flux follows and the consequent rise in potential in the fine section of the generating winding causes the current to break down the dielectric in the gap of the spark plug of one of the engine cylinders with the production of the ignition spark. The continued rotation and consequent further flux decrease generates an electro-motive force which sustains the spark current for an appreciable length of time, just as in the case of the direct high tension magneto. As the rotor reaches the end of its 180 degrees movement the cycle of operation begins again and thus is indefinitely repeated as the rotation continues.

When the speed of the generator has increased until its voltage is equal to or greater than the voltage of the battery the cut-out 72 operates to close the circuit whereupon current flows from the low tension generator to charge the battery and to energize the exciting winding 12$^b$ of the high tension generator. As the engine comes up to speed the spark can be advanced by adjustment of the casing 44.

In starting the engine, should there be any difficulty in securing satisfactory ignition, as when the engine is turned over very slowly, the switch 74 can be shifted to connect the battery 71 through lead 75 with the movable electrode of the breaker whereupon the electro-motive force of the battery is combined with that due to the movement of the high tension rotor to generate current in the coil 29$^a$ when the breaker is closed. Of course the electro-motive force generated by the turning of the rotor is alternately added to and subtracted from that of the battery, but as the generated electro-motive force due to the slow turning of the rotor is very much smaller than that of the battery, a satisfactory ignition spark is secured even when the respective electro-motive forces are in opposition. If for any reason the outside high tension circuit is interrupted either between the coil and distributor or between the distributor and spark plugs to ground, the high tension current, when the potential has risen high enough, will jump the safety air gap to ground, thus preventing an injurious rise of the potential.

The advantages incident to my invention will be better understood and appreciated from a consideration of the widely varying conditions under which an ignition and generating system of this character is called upon to operate.

In normal operating conditions it is obvious that the battery is liable to vary from a fully charged condition to its critical point or to a fully discharged condition, thus giving a variation, in the case of a six volt system, from about five volts to seven and one half volts, or about thirty per cent. This variation in voltage will cause corresponding variation of the excitation of the ignition generator and the apparatus must be so designed that such an exciting current will neither reduce the flux below that required to give a normal operation of the apparatus nor increase it to such a value that destructive arcing will be produced at the breaker or heating of the high tension winding ensue.

Furthermore, in starting a motor vehicle in cold weather by a motor starter, the current drawn from the battery is so excessive that, coupled with the effect on the battery of the low temperature, the battery voltage is sometimes reduced two or three volts. It is very desirable that the apparatus be adapted to give under these conditions a sufficiently hot spark for starting purposes and at the same time not be subject to a flux increase which will produce the aforementioned troubles of breaker arcing and heating of the high tension generating coils when the low tension generator begins to charge the battery and normal operation is resumed. With hand cranking under these cold weather conditions the voltage variations, of course, are not quite so marked but in this case it is necessary to have the apparatus so constructed that hot sparks may be obtained at a very low speed.

Again, it is always possible that the battery may temporarily be put out of commission entirely. In such a case, it is possible with the constructions shown in Figs. 7 and 8, presently to be described, to start by hand cranking. However, under running conditions a much greater variation of the low tension voltage is usually produced when the generator is used without the battery, the amount of variation depending, of course, upon the regulating system used.

It will be understood, then, that my invention contemplates establishing and maintaining, under such widely varying conditions of operation, a condition of the magnetic circuit for the ignition generator, such that the maximum value of the flux linking said circuit shall be affected substantially inappreciably by the variations of the exciting current or of the magneto-motive force. To this end, I maintain the reluctance of the air gap of said magnetic circuit relatively small compared with the reluctance of the iron section of said magnetic circuit and I proportion the iron section of said magnetic current so that its various parts will reach saturation at substantially the same instant or for the same total number of lines linking he circuit. Also, I make the air gap density and air gap reluctance such that the magneto-motive force required by this part of the circuit is relatively small compared with that required by the iron part of the circuit.

Since it is important, in carrying out my invention, that the air gap reluctance be relatively low in comparison with the iron reluctance of the magnetic circuit of the high tension generator, for the more definite guidance of the reader in this connection, the approximate relative values of these reluctances suitable for types of construction such as herein illustrated may be given. Assuming that the source of the exciting current has a normal voltage of 6 with a range of variation, under the various operating conditions, of 3 to 7 volts and that the exciting ampere turns are sufficient to insure a negligible variation of the ignition spark for the above noted variation of voltage from 3 to 7, then the ratio of the reluctance of the air gap to the reluctance of the iron part of the magnetic circuit should be approximately 1/6.

It is to be understood in this connection that this ratio will vary somewhat as the operating conditions vary, and in particular will vary with the change of the flux density as the exciting ampere turns vary due to variation in voltage. It will also be understood that the advantages incident to this feature of my invention can be secured in a substantial measure if the ratio is made larger than that stated and, as a matter of course, the ratio can well be made smaller than the values stated if structural and operating conditions permit. Again, the reader will understand that the value of this reluctance ratio necessary for satisfactory results will depend in a measure on the quality of the iron in the magnetic circuit. For example, if an iron with extremely high permeability and having a low hysteretic loss is employed, the value of the reluctance ratio in question may be larger than if an iron with low permeability and large hysteretic constant is used. The reluctance ratio of 1 to 6 above given assumes the use of an iron having a fairly high permeability.

With my improved apparatus, having the structural and operative characteristics set forth, it will be clear to those skilled in such matters that the maximum value of flux linking the high tension ignition generating winding will be little affected by any of the variations of the exciting current or of the magneto-motive force met with under actual operating conditions.

The provision, in my improved generator, of the rotating current and exciting field makes possible the reversal of the flux through the high tension generating winding and the correspondingly wide angular range through which the spark can be advanced or retarded. In this connection, it is to be observed that while I secure the wide working range rendered possible by the reversal of the flux through the high tension generating winding, I also secure the simplicity, ruggedness and reliability which result from the stationary mounting of the high tension generating winding and from the fixed connections of said winding. Furthermore the fixed position of the high tension generating winding facilitates the passing of current from the battery into the primary or coarse section of said winding, no brushes or moving connections being necessary.

Again, while an ignition spark is secured that conforms in its heat value and characteristics to the spark produced by the best high tension magnetos, no permanent magnets are used and no demagnetizing effects are to be feared, so that the direction of current from an outside source can be selected which will best co-operate with the generated current in the coarse section of the high tension winding and give a sparkless operation of the breaker at any speed.

In Figure 7 I have illustrated a modified form of my system. Where reference characters similar to those in Figure 6 are employed they represent similar parts or devices which need not again be described. The object of this modified construction is to insure satisfactory ignition when the battery is for any reason in-operative and hand cranking is necessary. The low tension generator is provided with exciting coils 77 and 78 which supplement the coils 15 and 16. The coil 77 is connected with the brush 13 of the generator with which coil 15 is connected, and the coils 77 and 78 are connected together in series, one terminal of the last named coil being connected through a lead 79 with one of the terminals of a switch 74ª which replaces the switch 74 in Figure 6. The switch 76 shown in Figure 6 is here replaced by switch 76ª which is interposed in the lead 22 and has an additional terminal which is connected by lead 80 with the lead 79.

With this modified system the battery current obviously can be employed for starting just as in the case of the system shown in Figure 6; but if the battery should for any reason be out of order or in-operative and hand cranking necessary to start the engine, satisfactory ignition can be secured by means of current from the low tension generator. For this purpose switch 74ª is thrown to connect the leads 73 and 79 and the switch 76ª is thrown to connect the lead 80 and lead 22. Thereupon current from the brush 13 of the generator not only flows through exciting coils 15 and 16 but also through the exciting coils 77 and 78 and thence through switch 74ª to the coarse section 29ª of the high tension generating coil, and through switch 76ª to the exciting winding 12ᵇ of the high tension generator. With this system of windings and connections the exciting coils 77 and 78 are connected in series with the load and the load tension generator picks up quickly and furnishes a sufficiently strong current to the coils of the high tension generator to insure adequate ignition current.

In Figure 8 I have shown another modified form of connections and windings for the generator which is designed to accomplish in another way the result secured by the system shown in Figure 7. As in the case of Figure 7, parts and devices similar to those in Figure 6 are designated by similar reference characters. In the present system lead 22 of Figure 6 is replaced by a lead 22′ which extends from the brush 13 of the generator to one terminal of a switch 81, and a lead 22ª which extends from a terminal of the said switch to the brush 21. The lead 22′ is also connected to one terminal of a switch 82 with which lead 73 is connected. 83 is a lead extending from lead 22′ (preferably connected therewith between brush 13 and cut-out 72) to one of the terminals of a three pole double throw switch 84.

In the present case the exciting winding of the low tension generator consists of two coils 85 and 86 which are connected together in series, the terminal of coil 85 being connected with brush 17 while the terminal of coil 86 is connected by lead 87 with one of the terminals of switch 84. A lead 88 connects one of the terminals of switch 84 with a terminal of switch 81, and a lead 89 connects a terminal of switch 84 with one of the terminals of switch 82.

In the operation of the last described system, if the battery is in working order current from it can be used for ignition purposes when starting by moving the switch 84 to its lower position and connecting lead 22' with leads 22ª and 73 through switches 81 and 82 respectively. But if the battery is out of order and cranking by hand is necessary, adequate current for ignition purposes can be drawn from the low tension generator by throwing switch 84 to its upper position and moving switches 81 and 82 to their full line positions. Current then flows through the exciting windings 85 and 86 and then by way of switch 84 and the breaker to the coarse section 29ª of the high tension generating coil and also by way of the switch 84, switch 81 and lead 22ª to the exciting coil 12ᵇ of the high tension generator. As the coils 85 and 86 in this case have a series connection the low tension generator picks up rapidly and generates a sufficiently strong current to insure satisfactory ignition at starting speeds.

When the engine is started the switch 84 can be thrown to its lower position whereupon the exciting coils 85 and 86 and also the movable electrode of the breaker are connected to ground while the low tension generator is connected through lead 83, switch 81 and lead 22ª with the exciting winding 12ᵇ of the high tension generator.

When current for ignition purposes is drawn through the series exciting coils 85 and 86, the fact that the circuit through the coils or primary windings 29ª is periodically interrupted does not interfere with the picking up of the low tension generator since there is a steady draft of current from the exciting coils 85 and 86 by way of the exciting coil 12ᵇ of the high tension generator. In this respect the actions of the two systems shown in Figs. 7 and 8 are similar, there being in each case a continuous draft of current through the exciting winding 12ᵇ. The special means which my invention provides for insuring strong ignition currents at low engine speeds is not claimed herein as that phase of the invention is covered by my application Serial No. 634,659 filed as a division hereof April 26, 1923.

It should be understood that my invention can be embodied in various forms that will be obvious to those skilled in such matters, and that the foregoing description and the drawings are illustrative and explanatory and not intended to define the scope of the invention.

What I claim is:

1. In a combined low tension current and high tension ignition current generator, the combination of a unitary stator structure comprising the magnetic stator of the low tension generator and the magnetic stator of the high tension generator, a unitary rotor structure comprising the magnetic rotor of the low tension generator and the magnetic rotor of the high tension generator, a high tension generating winding mounted on the magnetic stator of the high tension generator, a low tension direct current generating winding mounted on one of the said magnetic parts of the low tension generator, electric current means for exciting the fields of the high tension and low tension generators comprising a winding mounted on the magnetic rotor of the high tension generator to turn therewith, connections between the said generating winding of the low tension generator and the said exciting means, the high tension rotor being adapted in operation to distribute field flux through the high tension generating winding alternately in opposite directions, and a circuit breaker for opening and closing the circuit through the high tension generating winding synchronously with the movement of the rotor structure.

2. In a combined low tension current and high tension ignition current generator, the combination of a unitary stator structure comprising the magnetic stator of the low tension generator and the magnetic stator of the high tension generator, a unitary rotor structure comprising the magnetic rotor of the low tension generator and the magnetic rotor of the high tension generator, low tension windings mounted on the stator and the rotor of the low tension generator, a high tension generating winding mounted on the high tension stator and an exciting winding mounted on the magnetic rotor of the high tension generator to turn therewith, connections between the generating winding of the low tension generator and the said exciting winding, the high tension rotor being adapted in operation to distribute the field flux through the high tension generating winding alternately in opposite directions, and a circuit breaker for opening and closing the circuit through the high tension winding synchronously with the movement of the rotor structure.

3. In a combined low tension current and high tension ignition current generator, the combination of a unitary stator structure comprising the magnetic stators of the low and high tension generators, a magnetic rotor mounted to co-operate with the stator of the low tension generator, a magnetic rotor mounted to co-operate with the stator of the high tension generator, low tension windings mounted on the stator and rotor of the low tension generator, a high tension generating winding mounted on the stator of the high tension generator, a low tension exciting winding mounted on the rotor of the high tension generator to turn therewith, connections between the generating winding of the low tension generator and the said exciting winding, the high tension rotor being adapted in operation to distribute the field flux through the high tension generating winding alternately in opposite directions, and a circuit breaker for opening and closing the circuit through the high tension generating winding synchronously with the movement of the high tension rotor.

4. In a combined low tension current and high tension ignition current generator, the combination of a unitary stator structure comprising the magnetic stators of the low and high tension generators, a magnetic rotor mounted to co-operate with the stator of the low tension generator, a magnetic rotor mounted to co-operate with the stator of the high tension generator, low tension windings mounted on the stator and rotor of the low tension generator, a high tension generating winding mounted on the stator of the high tension generator, a low tension exciting winding mounted on the rotor of the high tension generator, connections between the generating winding of the low tension generator and the said exciting winding comprising a collector ring mounted to turn with the high tension rotor and a brush for said ring mounted on the stator structure, the high tension rotor being adapted in operation to distribute the field flux through the high tension generating winding alternately in opposite directions, and a circuit breaker for opening and closing the circuit through the high tension generating winding synchronously with the movement of the high tension rotor.

5. In apparatus for generating and distributing low tension currents and high tension ignition currents, the combination of a high tension generating winding comprising a coarse section and a fine section, a circuit breaker for opening and closing the circuit through the coarse section of said generating winding, a low tension direct current generator having an armature and field exciting means, said exciting means comprising a coil connected in series between one terminal of the low tension generator and one of the electrodes of the circuit breaker and also connected in series between the said terminal and a load circuit making a continuous draft of current.

6. In apparatus for generating and distributing low tension direct current and high tension ignition current, the combination with a high tension generator comprising a high tension generating winding having a coarse section and a fine section, an exciting winding for establishing a magnetic field in inductive relation to the said generating winding, means for varying the flux of said field through the said generating winding and a circuit breaker for opening and closing the circuit through the coarse section of the generating winding, of a low tension direct current generator having an armature and field exciting means, said exciting means comprising a coil connected in series between one terminal of the low tension generator and one terminal of the circuit breaker and also connected in series between the said terminal of the low tension generator and the exciting winding of the high tension generator.

7. A system for generating intermittent high tension current impulses for ignition purposes, comprising a source of direct current supply subject to variations of its voltage, a high tension generating winding, a magnetic circuit in inductive relation to said winding, and having a rotatable section for effecting variation of magnetic flux density through said winding, a current breaker for said generating winding, and an exciting winding in inductive relation to said magnetic circuit and energized by said source of direct current supply, the air gap reluctance of said magnetic circuit being relatively low in comparison with the magnetic reluctance of the iron part thereof.

8. A system for generating intermittent high tension current impulses for ignition purposes, comprising a source of direct current supply subject to variations of its voltage, a high tension generating winding, a magnetic circuit in inductive relation to said winding and having a rotatable section for effecting variation of magnetic flux density through said winding, a circuit breaker for said generating winding, and an exciting winding in inductive relation to said magnetic circuit and energized by said source of direct current supply, all iron parts of said magnetic circuit being shaped and proportioned to reach saturation approximately simultaneously.

9. A system for generating intermittent high tension current impulses for ignition purposes, comprising a source of direct current supply subject to variations of its voltage, a high tension generating winding, a magnetic circuit in inductive relation to said winding and having a rotatable section for effecting variation of magnetic flux density through said winding, a circuit breaker for said generating winding, and an exciting winding in inductive relation to said magnetic circuit and energized by said source of direct current supply, all iron parts of said magnetic circuit being shaped and proportioned to reach saturation approximately simultaneously, and the air gap reluctance of said magnetic circuit being relatively low in comparison with the magnetic reluctance of the iron part thereof.

10. A system for generating intermittent high tension current impulses for ignition purposes, comprising an electric storage battery, a high tension generating winding having a circuit breaker in circuit therewith, a magnetic circuit in inductive relation to said winding and having a rotatable iron section for effecting variation of magnetic flux density through said winding, and an exciting winding in inductive relation to said magnetic circuit and energized by current flowing from said battery, said winding, battery, air gap reluctance of said magnetic circuit and reluctance of the iron part of said magnetic circuit being correlated so that the cyclical maximum flux value through said winding remains substantially constant for variations in said battery voltage from fully charged condition to the critical point of said battery.

11. A system for generating intermittent high tension current impulses for ignition purposes, comprising a storage battery subject in use to varying temperatures, drafts of current and charging conditions, a high tension generating winding, a magnetic circuit in inductive relation to said winding and having a rotatable section for effecting variation of magnetic flux density through said winding, a current breaker for said generating winding, and an exciting winding in inductive relation to said magnetic circuit and energized by current from said storage battery, the air gap reluctance of said magnetic circuit being relatively low in comparison with the magnetic reluctance of the iron part thereof.

12. A system for generating intermittent high tension current impulses for ignition purposes, comprising a storage battery subject in use to varying temperatures, drafts of current and charging conditions, a high tension generating winding, a magnetic circuit in inductive relation to said winding and having a rotatable section for effecting variation of magnetic flux density through said winding, a circuit breaker for said generating winding, and an exciting winding in inductive relation to said magnetic circuit and energized by current from said storage battery, all iron parts of said magnetic circuit being shaped and proportioned to reach saturation approximately simultaneously.

13. A system for generating intermittent high tension current impulses for ignition purposes, comprising a storage battery subject in use to varying temperatures, drafts of current and charging conditions, a high tension generating winding, a magnetic circuit in inductive relation to said winding and having a rotatable section for effecting variation of magnetic flux density through said winding, a circuit breaker for said generating winding, and an exciting winding in inductive relation to said magnetic circuit and energized by current from said storage battery, all iron parts of said magnetic circuit being shaped and proportioned to reach saturation approximately simultaneously, and the air gap reluctance of said magnetic circuit being relatively low in comparison with the magnetic reluctance of the iron part thereof.

14. In a system for generating high tension current for ignition purposes and low tension current for other purposes, the combination of a low tension generator driven in operation at various speeds, a storage battery adapted to be charged with current from said generator and subject in operation to varying temperatures and drafts of current, a high tension generating winding, a magnetic circuit in inductive relation to said winding and having a rotatable section for effecting variation of magnetic flux density through said winding, a current breaker in the circuit of the said generating winding, and an exciting winding in inductive relation to said magnetic circuit and energized alternatively by current from said storage battery or from said low tension generator, the air gap reluctance of said magnetic circuit being relatively low in comparison with the magnetic reluctance of the iron part thereof.

15. In a system for generating high tension current for ignition purposes and low tension current for other purposes, the combination of a low tension generator driven in operation at various speeds, a storage battery adapted to be charged with current from said generator and subject in operation to varying temperatures and drafts of current, a high tension generating winding, a magnetic circuit in inductive relation to said winding, and having a rotatable section for effecting variation of magnetic flux density through said winding, a current breaker in the circuit of the said generating winding, and an exciting winding in inductive relation to said magnetic circuit and energized alternatively by current from said storage battery or from said low tension generator, all iron parts of said magnetic circuit being shaped and proportioned to reach saturation approximately simultaneously.

16. In a system for generating high tension current for ignition purposes and low tension current for other purposes, the combination of a low tension generator driven in operation at various speeds, a storage battery adapted to be charged with current from said generator and subject in operation to varying temperatures and drafts of current, a high tension generating winding, a magnetic circuit in inductive relation to said winding and having a rotatable section for effecting variation of magnetic flux density through said winding, a current breaker in the circuit of the said generating winding, and an exciting winding in inductive relation to said magnetic circuit and energized alternatively by current from said storage battery or from said low tension generator, all iron parts of said magnetic circuit being shaped and proportioned to reach saturation approximately simultaneously, and the air gap reluctance of said magnetic circuit being relatively low in comparison with the magnetic reluctance of the iron part thereof.

17. A system for generating intermittent high tension current impulses for ignition purposes comprising a high tension generating winding, a magnetic circuit in inductive relation to said generating winding having a source of magneto-motive force subject to variation and comprising a section for effecting variation of magnetic flux density through said winding, and a current breaker for the generating winding, all iron parts of said magnetic circuit being shaped and proportioned to reach saturation approximately simultaneously.

18. A system for generating intermittent high current impulses for ignition purposes comprising a high tension generating winding, a magnetic circuit in inductive relation to said generating winding having a source of magneto-motive force subject to variation and comprising a section for effecting variation of magnetic flux density through said winding, and a current breaker for the generating winding, all iron parts of said magnetic circuit being shaped and proportioned to reach saturation approximately simultaneously and the air gap reluctance of said magnetic circuit being relatively low in comparison with the magnetic reluctance of the iron part thereof.

In testimony whereof, I affix my signature.

CHARLES H. TOWER.